May 17, 1927.                                                                    1,629,409
K. E. PEILER
APPARATUS FOR SEPARATING MOLTEN GLASS INTO MOLD CHARGES
Filed March 7, 1922                          3 Sheets-Sheet 1

Inventor:
Karl E. Peiler
by W. H. Honiss.
Att'y.

Patented May 17, 1927.

1,629,409

UNITED STATES PATENT OFFICE.

KARL E. PEILER, OF WEST HARTFORD, CONNECTICUT, ASSIGNOR TO HARTFORD-EMPIRE COMPANY, OF HARTFORD, CONNECTICUT, A CORPORATION OF DELAWARE.

APPARATUS FOR SEPARATING MOLTEN GLASS INTO MOLD CHARGES.

Application filed March 7, 1922. Serial No. 541,639.

This invention relates to apparatus for separating molten glass into mold charges for use in the molds of shaping machines.

The invention includes a container for the molten glass, having a submerged outlet through which the glass is discharged to form suspended gathers from which mold charges are severed, and means for controlling and regulating the discharge therefrom. Although those means co-operate to produce the general result; namely, mold charges of the desired form and weight, they are so devised and arranged as to provide a more or less separate control of the two functions of form and weight regulation, and are separately and independently adjustable, one for determining the weight or size of the mold charge, and the other for controlling the shape of the gather so that the mold charge severed therefrom may be of the shape best adapted for use in the particular mold for which it is intended.

The weight regulating means preferably consists of a tube projecting into the glass in the container, in alignment with the outlet and leaving an annular passageway between the bottom of the tube and the bottom of the container. The size of this passageway may be adjusted to regulate the flow of glass to the outlet and therefore the weight of the mold charges, by varying the vertical position of the tube.

The shape controlling means is a plunger extending through the tube and preferably having its lower end projecting into a cylindrical chamber or well in the bottom of the container, forming a passageway through which the glass passes to the discharge outlet. The plunger with its adhering annulus of glass acts as pistons, both in the lower end of the tube and in the well, having therefore a tandem action. Mechanism is provided to reciprocate the plunger so that its lower end moves toward and from the outlet. The extent of movement of the plunger is preferably such that its lower end remains within the well during reciprocation, whereby continued and maximum control of discharge at the outlet is effected by the plunger positions and movements. By suitably raising or lowering the path of reciprocation of the plunger, and varying the speed of its movements, the discharge of glass may be accelerated and retarded and mold charges of various shapes may be produced, some of which are illustrated in my co-pending application Serial No. 294,792, filed May 5, 1919.

The several objects of the invention and features employed for their accomplishment, will best be understood from the following description and accompanying drawings of one embodiment of the invention, in which:—

Fig. 4 is a bottom plan of the shearing mechanism, partly in section, on the line 4—4 of Fig. 3; and Fig. 5 is a detail in elevation showing the construction of plunger operating cam, made in adjustable and removable sections.

Figure 1:
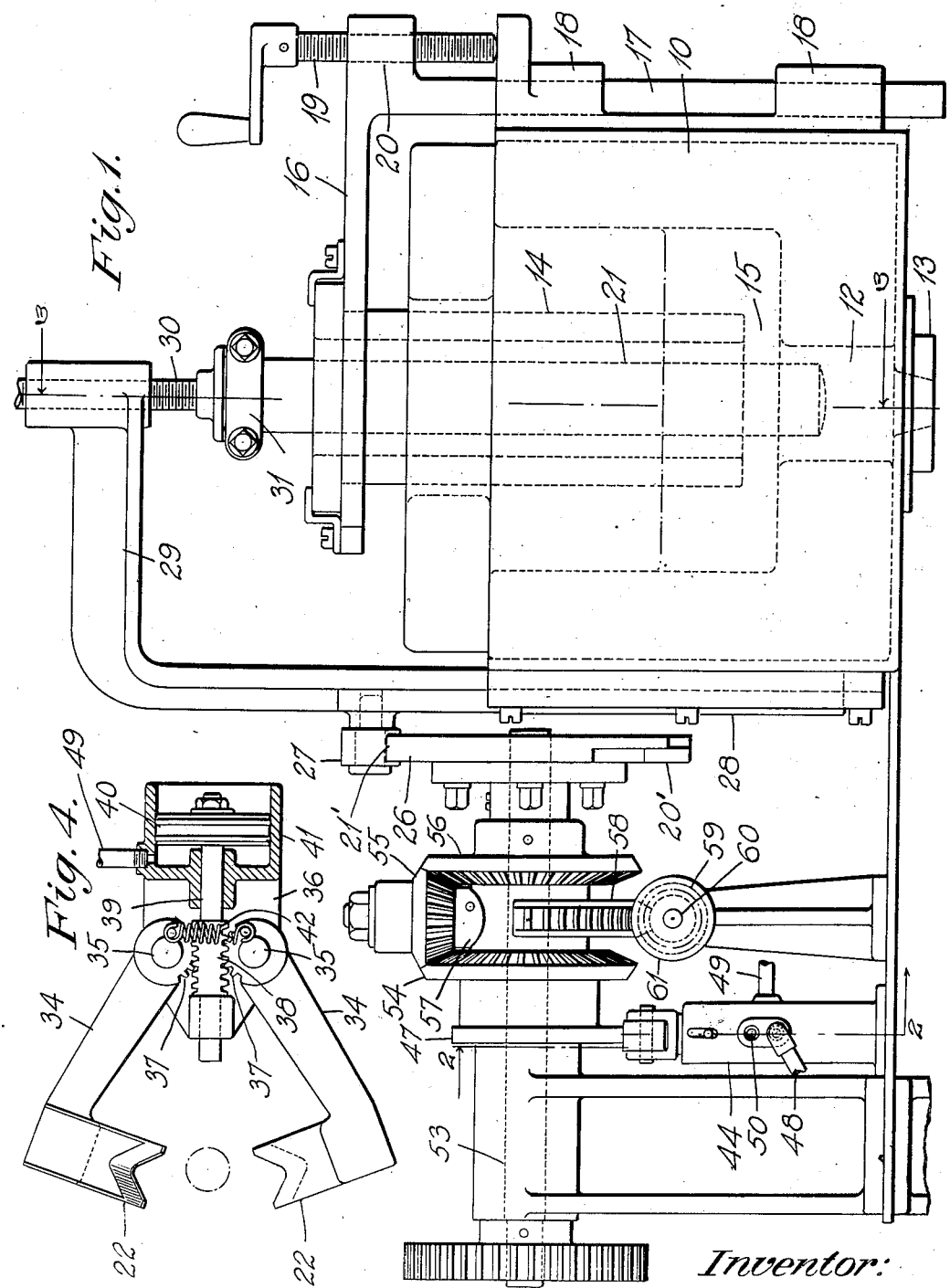
Figure 1 is a front elevation of the forehearth of a glass furnace and the associated mechanism.

The container 10 for the molten glass may be a forehearth projecting from a furnace of the usual type and provided with a gate 11 (Fig. 3) for regulating the flow of glass to the front of the forehearth. Suitable gas burners are preferably provided for heating the interior of the forehearth to any desired degree. The glass is discharged from the forehearth through a well 12, having a restricted outlet in its lower end formed by an outlet ring 13. The flow of glass to the well 12 is regulated by a tube 14 of suitable refractory material, forming between its lower end and the floor of the forehearth, an annular passageway 15 (Fig. 3) through which the glass enters the well. In order to vary the rate of this flow and thereby vary the weight of the mold charges, the tube is vertically adjustable either before or during operation to vary the area of the passageway 15. For this purpose the upper end of the tube is secured to an arm 16 projecting from the upper end of a slide 17 mounted in guides 18 on the side of the container. The tube may be adjusted vertically toward and from the well in any convenient way, as by a screw 19 (Fig. 1) threaded through a lug 20 on the slide 17 and bearing against a lug projecting from one of the guides 18. Except for this adjustment the tube is stationary during the feeding operations.

The shape of the gathers discharged from and suspended beneath the outlet is controlled by a reciprocating plunger 21 extending centrally through the tube and projecting into the well 12, and with its adhering annulus of glass acting as a piston in each of them. The viscous glass serves in both the functions of packings or piston rings. The lower end of the plunger acts in the well as a piston to accelerate the discharge of glass on its downstroke and to retard or reverse the movement of the glass in the outlet on its upstroke, the effects being modified by the proportion of the parts and by varying the speed of the plunger movement. Thus the stub of glass remaining after severing a mold charge by shears 22 may be retracted more or less toward or within the outlet by upward movement of the plunger. Within the lower end of the tube, the plunger and its adhering annulus of viscous glass around it operates as an annular piston or diaphragm. On its upward stroke the piston draws up into the tube at 9 some of the glass which enters through the annular passageway 15, thus tending to make that inflow substantially continuous, although not necessarily uniform, and at the same time relieving to a considerable degree the effect of the hydrostatic head on the glass below that passageway, and thereby increasing the retractive effect of the piston action within the well. Upon the downward movement of the plunger, the full hydrostatic head is restored, thus increasing the piston effect of that movement of the plunger in the well.

Figure 3:
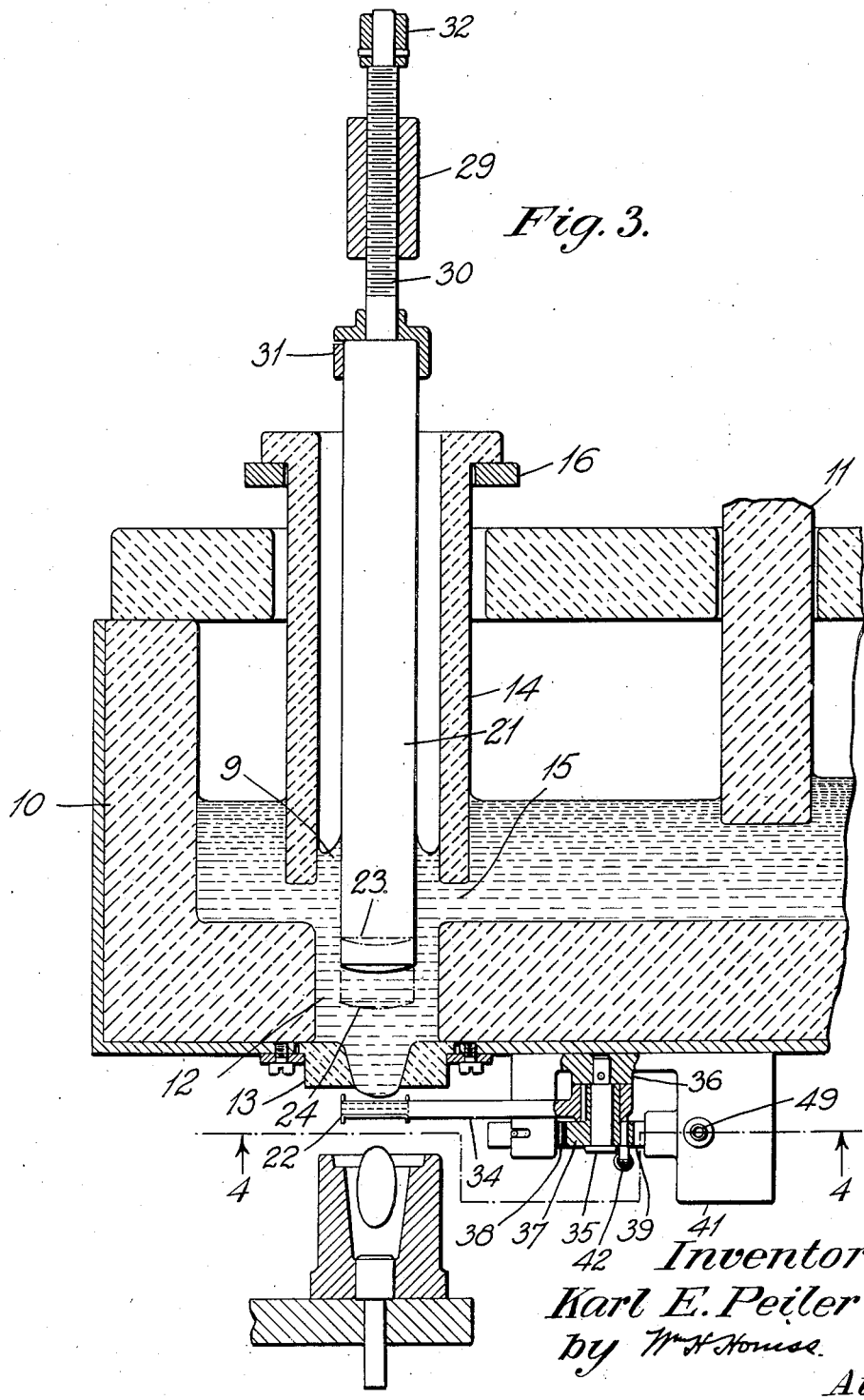
Fig. 3 is a side elevation, in section, on the line 3—3 of Fig. 1.

In Fig. 3 the high and low positions of the bottom of the plunger are indicated approximately by the dotted lines 23 and 24 respectively, but these positions may be adjusted toward or from the outlet ring 13 to assist in varying the shape of the mold charges.

Figure 2:
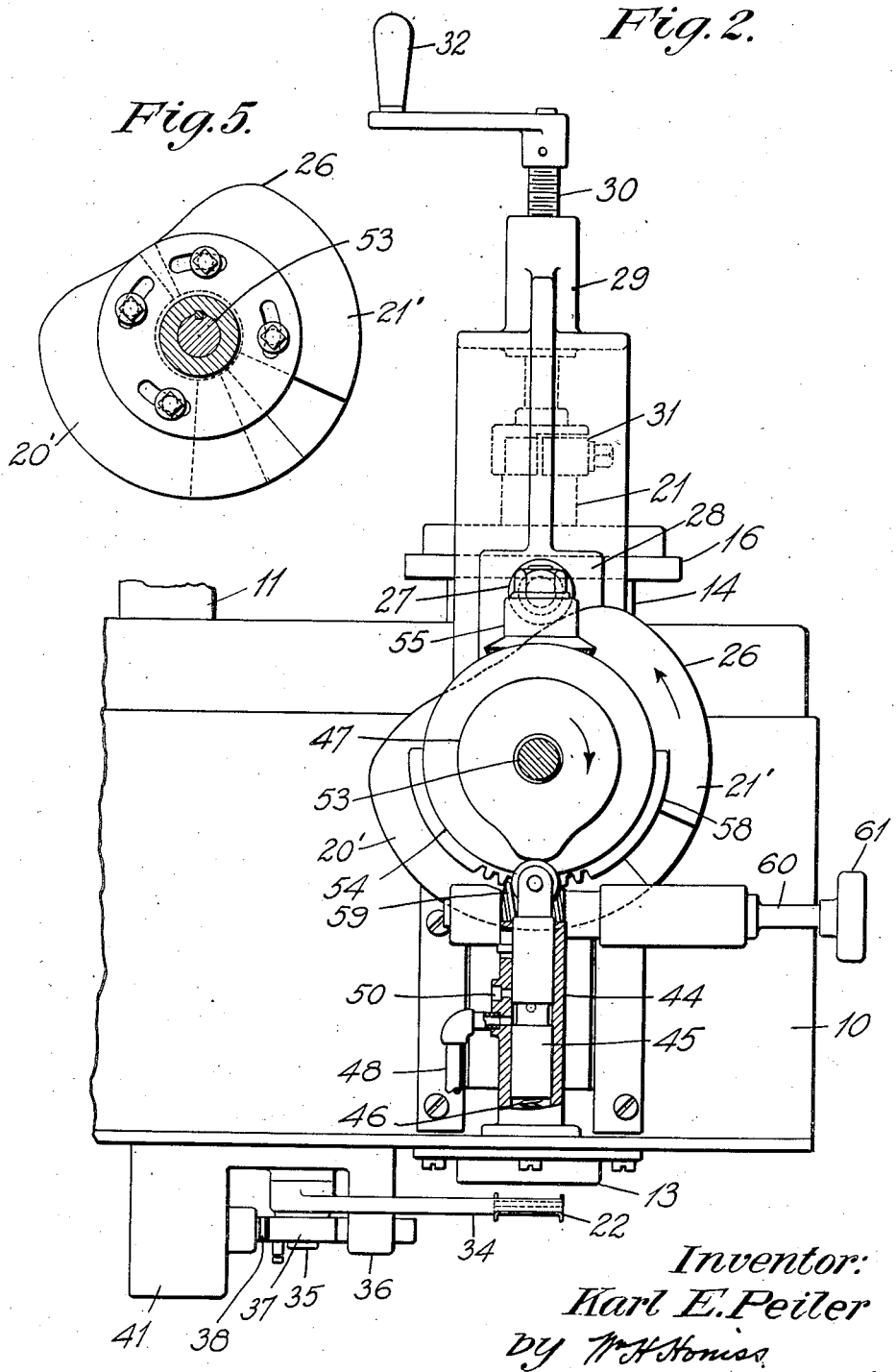
Fig. 2 is a side elevation, partly in section, taken on the line 2—2 of Fig. 1.

The plunger is reciprocated by a cam 26 engaging a roll 27 mounted on a slide 28 having a laterally projecting arm 29 to which the plunger is connected. In order that the path of movement of the plunger may be adjusted vertically, the plunger is connected with the arm 29 by a screw 30 rigidly connected with the plunger by a clamp 31. The screw is provided with a crank 32 (Fig. 2) by which it may be turned to adjust the vertical position of the plunger stroke without changing its amplitude. If desired, the amplitude of the plunger stroke may be altered also by interposing an appropriate linkage between the cam roll 27 and the slide 28.

The cam 26 may be constructed with removable and adjustable lobes 21' and 20' (Fig. 5) to respectively control the rise and fall of the plunger. These lobes may be adjusted in angular position relative to each other and to the body of the cam and they may be replaced by others of different shape, thus enabling the shape of the mold charges to be varied at will.

The shears 22 may be of any well known construction such, for example, as shown in Fig. 4, in which they are carried on arms 34 mounted on studs 35 fixed in a casting 36. The adjacent surfaces of the hubs of the arms 34 are provided with segmental gears 37 which engage racks 38 formed on a rod 39 connected with a piston 40. The piston is carried in a cylinder 41 formed on the casting 36, whereby the movement of the piston to the right in Fig. 4 causes the shears to close. The shears are opened and the piston returned to the position of this figure by a spring as at 42 connecting the arms 34.

The shears sever the mold charge preferably during the retardation or retraction of the glass in the outlet ring 13, but in order that the time of severing may be adjusted with relation to the discharge of the mold charge, the shear actuating mechanism is made adjustable relative to the plunger actuating cam 26. The shear operations are controlled by a valve device 44 (Figs. 1 and 2) having a plunger 45 which is depressed, against the action of a spring 46, by a cam 47, to admit air pressure to the cylinder 41 to close the shears. The valve device 44 is of the usual construction which by depression of its plunger 45, opens a connection between a pipe 48 connected with a source of air pressure and a pipe 49 leading to the cylinder 41. As the rise of the cam 47 moves away from the upper end of the plunger 45, the spring 46 moves the valve plunger into position to connect the pipe 49 with an exhaust port 50 (Fig. 2), allowing the shears to open.

The plunger cam 26 and the shear cam 47 are both mounted on and driven from a shaft 53 and means is provided for adjusting the angular relation of the two cams. One of them, in this case the shear cam 47, is loosely mounted on the shaft 53 and provided with a bevel gear 54 meshing with an idle pinion 55 also in mesh with a bevel gear 56 fixed on the shaft 53. The cam 47 is adjusted angularly about the shaft 53 while maintaining the driving relation therewith, by adjusting the idle pinion 55 about the shaft. For this purpose the pinion 55 is carried by a hub 57 loosely mounted on the shaft 53 and provided with a segmental worm gear 58 engaging a worm 59 on a shaft 60 mounted in suitable bearings and provided with a hand wheel 61. By turning the wheel, the pinion 55 may be turned forward or back with relation to the rotation of the shaft 53 to adjust the angular position of the cam 47, and thus making the shears cut earlier or later, relative to the plunger operations, without interrupting the continuous operation of the machine. This device may be applied to the plunger cam 26 instead of to the shear cam, thus keeping the shear timing constant, and advancing or retarding the time of the plunger movements.

The embodiment of the invention described has been selected for the purpose of illustrating one of the many possible embodiments of the invention. The plunger 21, well 12, and tube 14, are preferably made cylindrical for ease of construction, but may be of any desired cross section. The plunger 21 is shown as being uniform in size throughout its length, but it may be of different diameters at different portions of its length. The interior diameters of the well 12, and tube 14, and the coacting portions of the plunger 21 and their proportions to each other, may be varied so as to obtain the desired piston or displacement effects in each. The invention may be otherwise modified and the arrangement and construction of the parts herein shown may be changed without departing from the scope of the invention as defined by the appended claims.

I claim:—

1. In apparatus for segregating mold charges of regulated weight and shape from molten glass, the combination of a container for the glass having a submerged discharge outlet, means for regulating the weight of the charges independently of their shape, including a weight regulating member projecting into the glass over the outlet and permanently spaced therefrom at a position suited for the inflow of the desired amount of glass, a shape controlling plunger projecting into the outlet, and means for imparting periodic movements to the plunger, each movement being regulated to discharge the glass through the outlet at a varying rate to produce masses of predetermined shape.

2. In apparatus for segregating mold charges of regulated weight and shape from molten glass, the combination of a container for the glass having a submerged discharge outlet, means for regulating the weight of the charges independently of their shape, including a weight regulating member projecting into the glass over the outlet and permanently spaced therefrom at adjustable distances, a shape controlling plunger projecting into the outlet, and means for moving the plunger to discharge each mass of glass at a rapidity varying during the discharge to control the shape of the discharged mass.

3. In apparatus for segregating molten glass in mold charges, the combination of a container for the glass having a submerged discharge outlet, a member having a tubular end projecting into the glass in substantial alignment with the outlet and adjustable to different stationary positions, leaving a permanently open annular adjustable passage for the flow of glass to the outlet to regulate the weight of the mold charges, a plunger extending permanently past the said passage for effecting the periodic discharge of the glass admitted through the passage, and means for reciprocating the plunger to move its lower end toward and from said outlet from a position below the said passage.

4. In apparatus for segregating molten glass in mold charges, the combination of a container for the glass having a submerged discharge outlet, a well above the outlet, a member having a tubular end projecting into the glass with its end substantially concentric with the well and adjustable to different stationary positions, leaving a permanently open annular adjustable passage for the flow of glass to the well to regulate the weight of the mold charges, a plunger extending through and permanently past the tubular end into the well for effecting the periodic discharge of the glass received in the well, and means for operating the plunger in the well to periodically discharge the glass therefrom.

5. In apparatus for separating molten glass into formed mold charges, the combination of a container for the glass having a well in its bottom terminating in a discharge outlet, a stationary tubular member projecting into the glass above the outlet, a vertically movable plunger projecting though the tubular member into the well, means for moving said plunger periodically to discharge the glass from the well at a regulated and variable rate to form masses of glass of controlled shape beneath the outlet, and shears operating periodically beneath the outlet in timed relation to the plunger movements to sever a mold charge from each suspended mass.

6. In apparatus for separating molten glass into formed mold charges, the combination of a container for the glass having a well in its bottom terminating in a discharge outlet, a stationary tubular member projecting into the glass above the outlet, leaving a permanently open passage for the flow of glass and adjustable vertically to regulate the flow area of said passage, a vertically movable plunger projecting through the tubular member into the glass to control the discharge of glass through the outlet, means for operating said plunger periodically in the well to discharge the glass at a regulated and variable rate, to produce the desired formed masses of glass suspended beneath the outlet, and shears operating periodically beneath the outlet in timed relation to the plunger movements to sever a mold charge from each suspended mass.

7. In apparatus for separating molten glass into formed mold charges, the combination of a container for the glass having a submerged well terminating in a discharge outlet, a stationary tubular member projecting into the glass above the outlet leaving a permanently open flow passage and adjustable vertically to regulate the area of said passage, a vertically movable plunger projecting through the tubular member into the well for controlling the shape of the mold charges, means for moving said plunger periodically at a controlled rate to form successive suspended masses of glass of predetermined and variable shape beneath the outlet, and shears operating periodically beneath the outlet in timed relation to the plunger movements to sever a mold charge from each suspended mass.

8. In apparatus for separating molten glass into mold charges, the combination of a container for the glass having a well in its bottom terminating in a discharge outlet, a stationary tubular member projecting into the glass substantially in alignment with the well, a vertically reciprocable plunger projecting through the tubular member into the well, means for periodically reciprocating the plunger while maintaining its lower end in the well, and shearing mechanism below the outlet operating in timed relation to the plunger reciprocations.

9. In apparatus for separating molten glass into mold charges, the combination of a container for the glass having a well in its bottom provided with a discharge outlet, a stationary tubular member projecting into the glass above the well in substantial alignment therewith to control the flow of glass thereto, said member being adjustable toward and from the well to produce different size mold charges, a plunger projecting through the tubular member and movable within the well to continuously control the discharge of glass therethrough, and means for adjusting the plunger to alter its path of movement in the well.

10. Apparatus for feeding molten glass, comprising a container having a downwardly opening discharge outlet, a vertically reciprocable carriage mounted outside of said container, guiding means also outside of said container, for guiding said carriage in its vertical reciprocations, an implement for controlling the discharge of glass through said outlet, an implement holder carried by said carriage and adjustable vertically with respect to said carriage, said implement being held by said holder in vertical axial alignment with said outlet, clamping means for rigidly securing said implement to said holder, shears comprising blades arranged to meet axially beneath said outlet to sever mold charges from the discharged glass, means for reciprocating said carriage, and means for opening and closing said shears in timed relation to the reciprocation of said carriage.

11. Apparatus for feeding molten glass, comprising a container having a downwardly opening discharge outlet, a vertically reciprocable carriage mounted outside of said container, guiding means also outside of said container, for guiding said carriage in its vertical reciprocations, an implement for controlling the discharge of glass through said outlet, an implement holder carried by said carriage and adjustable vertically with respect to said carriage, said implement being held by said holder in vertical axial alignment with said outlet, clamping means for rigidly securing said implement to said holder, shears comprising blades arranged to meet axially beneath said outlet to sever mold charges from the discharged glass, means for reciprocating said carriage, means for opening and closing said shears in timed relation to the reciprocation of said carriage, and means for varying the vertical position of said holder with respect to said carriage to vary the vertical position of said implement at the time when the said shears sever the glass.

Signed at Hartford, Connecticut, this 2nd day of March, 1922.

KARL E. PEILER.